United States Patent
Bertholin et al.

(10) Patent No.: US 11,885,488 B2
(45) Date of Patent: Jan. 30, 2024

(54) CLC FACILITY COMPRISING A SOLID/SOLID SEPARATOR WITH MEANS FOR DISTRIBUTING A GAS-SOLID MIXTURE

(71) Applicants: IFP Energies nouvelles, Rueil-Malmaison (FR); TOTAL RAFFINAGE CHIMIE, Courbevoie (FR)

(72) Inventors: Stephane Bertholin, Rueil-Malmaison (FR); Ann Cloupet, Rueil-Malmaison (FR); Florent Guillou, Rueil-Malmaison (FR); Airy Tilland, Rueil-Malmaison (FR); Benjamin Amblard, Rueil-Malmaison (FR); Sina Tebianian, Rueil-Malmaison (FR); Mahdi Yazdanpanah, Le Havre (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 523 days.

(21) Appl. No.: 17/261,509

(22) PCT Filed: Jul. 18, 2019

(86) PCT No.: PCT/EP2019/069366
§ 371 (c)(1),
(2) Date: Jan. 19, 2021

(87) PCT Pub. No.: WO2020/020739
PCT Pub. Date: Jan. 30, 2020

(65) Prior Publication Data
US 2021/0293407 A1 Sep. 23, 2021

(30) Foreign Application Priority Data
Jul. 23, 2018 (FR) .................................... 18/56.808

(51) Int. Cl.
*F23C 10/01* (2006.01)
*F23C 10/02* (2006.01)
(Continued)

(52) U.S. Cl.
CPC .............. *F23C 10/01* (2013.01); *F23C 10/02* (2013.01); *F23C 10/08* (2013.01); *F23C 10/20* (2013.01); *F23C 13/00* (2013.01)

(58) Field of Classification Search
CPC .......... F23C 10/01; F23C 10/08; F23C 99/00; F23C 2900/99008; F23C 10/20; F23C 10/04; Y02E 20/34
See application file for complete search history.

(56) References Cited

U.S. PATENT DOCUMENTS

| | | | |
|---|---|---|---|
| 2011/0179799 A1* | 7/2011 | Allam | F02C 3/20 110/297 |
| 2012/0167808 A1* | 7/2012 | Beal | F23C 10/002 110/301 |

(Continued)

FOREIGN PATENT DOCUMENTS

| | | |
|---|---|---|
| JP | 2016-200308 A | 12/2016 |
| WO | 2011/151535 A2 | 12/2011 |

(Continued)

OTHER PUBLICATIONS

International Search Report for PCT/EP2019/069366, dated Oct. 8, 2019; English translation submitted herewith (6 pgs.).

*Primary Examiner* — Ko-Wei Lin
(74) *Attorney, Agent, or Firm* — FITCH, EVEN, TABIN & FLANNERY, LLP

(57) ABSTRACT

The invention relates to a CLC plant for the combustion of solid hydrocarbon feedstocks generating particles of unburnt residues, comprising a solid/solid separator above the combustion reactor in order to efficiently separate the particles of the oxygen-carrying solid from the particles of unburnt (Continued)

residues contained in the gas/solid mixture (14) exiting from the combustion reactor. The chamber (1) of the solid/solid separator, the combustion reactor and the inlet (2) for the gas/solid mixture (14) of the chamber have a parallelepiped shape. The inlet (2) is equipped at its top with means (3) for distribution of said gas/solid mixture in the chamber which extend over the entire length of the inlet, improving the solid/solid separation.

20 Claims, 6 Drawing Sheets

(51) Int. Cl.
    *F23C 10/08*     (2006.01)
    *F23C 10/20*     (2006.01)
    *F23C 13/00*     (2006.01)

(56)     References Cited

U.S. PATENT DOCUMENTS

2016/0102255 A1*   4/2016   Hoteit .................... F23C 10/01
                                                                                                        431/170
2016/0265764 A1*   9/2016   Abdulally ................ C10K 1/20

FOREIGN PATENT DOCUMENTS

WO     2011/151537 A2   12/2011
WO     2014/162075 A1   10/2014

* cited by examiner

CLC FACILITY COMPRISING A SOLID/SOLID SEPARATOR WITH MEANS FOR DISTRIBUTING A GAS-SOLID MIXTURE

CROSS-REFERENCE TO RELATED APPLICATIONS

This application is a U.S. national phase application filed under 35 U.S.C. § 371 of International Application No. PCT/EP2019/069366, filed Jul. 18, 2019, designating the United States, which claims priority from French Patent Application No. 18/56.808, filed Jul. 23, 2018, which are hereby incorporated herein by reference in their entirety.

FIELD OF THE INVENTION

The present invention relates to the field of the combustion of hydrocarbon feedstocks by chemical looping oxidation/reduction (CLC) operating as fluidized bed, and more particularly the chemical looping combustion operating as fluidized bed of solid hydrocarbon feedstocks.

GENERAL CONTEXT

The chemical looping combustion (CLC) process is a process consisting in carrying out oxidation/reduction reactions of an active mass, typically a metal oxide, in order to break the combustion reaction down in two successive reactions: a first reaction of oxidation of the active mass in contact with an oxidizing gas, typically air, and a second reaction of reduction of the active mass in contact with the feedstock, the combustion of which is desired. In the CLC process, the oxidation/reduction active mass thus acts as oxygen carrier. This solid material is provided in the form of particles which circulate according to different fluidized bed transportation conditions in the loop. These particles are oxidized on contact with air in a first reaction zone, known as air reactor. They are subsequently transported into a second reaction zone known as fuel reactor, where they are brought into contact with a solid (for example: coal, coke, petroleum coke or "pet-coke", biomass, oil sands, household waste), liquid (for example: fuel oil, bitumen, diesel, gasoline, shale oil, and the like) or gaseous (for example: natural gas, syngas, biogas, shale gas) hydrocarbon feedstock, the combustion of which is desired. The oxygen transported by the particles of oxygen transporter material feeds the combustion of the feedstock. This results in a gaseous effluent formed by the combustion of the feedstock and a stream of reduced particles. The particles are returned to the air reactor to be reoxidized therein, thus closing the loop.

The CLC process makes it possible to produce energy (steam, electricity, and the like) by recovery of the heat given off by the combustion reactions while facilitating the capture of the carbon dioxide ($CO_2$) emitted during the combustion by virtue of the production of flue gases rich in $CO_2$. This is because the $CO_2$ can be captured after condensation of the steam and compression of the flue gases, and it can then be stored, for example in a deep aquifer, or be upgraded, for example by employing it for improving the output of oil operations in enhanced oil recovery (EOR) or enhanced gas recovery (EGR) processes.

The CLC process can also make possible the production of synthesis gas, indeed even of hydrogen, by controlling the combustion and by carrying out the required purifications downstream of the combustion process.

Another advantage results from this mode of combustion: the production of a stream very rich in nitrogen, which is the depleted air obtained on conclusion of the oxidation of the active mass in the air reactor. Depending on the degree of purity achieved, this nitrogen stream can be upgraded in various applications, in particular in the field of the oil industry. It can, for example, be used in refineries as inert gas in various oil refining processes or for the treatment of production waters, or as gas injected into the subsoil in EOR processes.

During the combustion of solid hydrocarbon feedstocks, such as coal, particles of unburnt residues are generally formed, which then constitute a population of particles distinct from that of the particles of the oxygen carrier.

In an implementation by circulating fluidized beds, these particles of unburnt residues can be entrained from the combustion reactor to the reactor for oxidation of the oxygen carrier, which can result in the formation of $CO_2$ in the oxidation reactor and thus in $CO_2$ emissions at the outlet of the oxidation reactor, which is not desired. Other problems can arise as a result of the entrainment of particles of unburnt residues into the oxidation reactor, such as the presence in the depleted air stream of compounds harmful to the environment, such as SOx and NOx resulting from the combustion of the unburnt residues by air, or the contamination of the refractories of the air reactor by the impurities of the feedstock. In the event of significant entrainment, too high a concentration of these compounds would necessitate the installation of treatment processes which would damage the economic advantage of the plant. The particles of unburnt residues can also be entrained with the combustion gases out of the combustion reactor, which is undesirable because they constitute elements which pollute the atmosphere and because this damages the energy efficiency of the process.

The term "particles of unburnt residues" is understood to mean the particles of the solid hydrocarbon feedstock (fuel) which have not undergone total combustion and which consequently still contain hydrocarbon compounds. The particles of unburnt residues are to be distinguished from ash, which is essentially inorganic in nature (ash typically comprising the following compounds: $SiO_2$, $Al_2O_3$, $Fe_2O_3$, CaO, MgO, $TiO_2$, $K_2O$, $Na_2O$, $SO_3$, $P_2O_5$).

Various systems are known for preventing the entrainment of particles of unburnt residues in the combustion flue gases or into the oxidation reactor of the CLC.

The application WO11151537 describes a device for separating the particles of unburnt residues from the particles of the oxygen carrier contained in the gaseous mixture originating from the combustion zone of a CLC plant. This device, which can be called a solid/solid separator, in order to distinguish it from conventional "gas/solid" separators, such as cyclones, is placed above the combustion zone, and comprises a chamber comprising an upper part operating as dilute phase and a lower part operating as dense phase. The gas mixture containing the two populations of particles is admitted through an inlet pipe emerging in the dilute phase of the chamber of the solid/solid separator, and the densest particles, e.g. the particles of the oxygen carrier, are discharged via a discharge pipe located in the lower part of the chamber, while the lightest particles, e.g. the particles of unburnt residues, exit with the gas via an outlet pipe located in the upper part of the chamber of the separator. The particles of the oxygen carrier are then sent to the oxidation reactor, and the particles of unburnt residues are sent to a gas/solid separator, typically a cyclone, making it possible to recycle the particles of unburnt residues in the combustion reactor. The solid/solid separator according to WO11151537 preferably exhibits a symmetry of revolution, the chamber being cylindrical.

On the same principle, the application WO11151535 describes a CLC process employing a similar solid/solid separator making it possible to separate the particles of unburnt residues from the particles of the oxygen carrier contained in the gas mixture originating from the combustion zone of a CLC plant. The application WO11151535 discloses in particular a solid/solid separator placed above a second combustion zone constituted by a reactor of elongated shape entering the chamber of the separator. Although the shape of the separator is not specified, some figures implicitly refer to an item of equipment of cylindrical shape. The solid/solid separator according to WO11151535 can also comprise an insert in the form of a divergent cone at the outlet of the combustion reactor entering the chamber of the separator, in order to facilitate the distribution of the gas mixture containing particles over the entire section of the separator.

These solid/solid separators of cylindrical shape are not always suitable for an industrial use involving large-sized items of equipment. This is because large-scale industrial plants carrying out combustion operations at high temperature and at low pressure are generally constructed with a geometry of rectangular section, as is, for example, the case with steam reforming furnaces, steam cracking furnaces, fluidized bed combustion boilers, pulverized coal boilers, and the like. This configuration is in particular advantageous for simplifying the installation of refractory materials arranged over the entire internal surface in order to protect the metal chamber from high temperatures. This configuration also makes it possible to facilitate the scale operation of the plants since it suffices to duplicate a unit element in one dimension to increase the capacity of the item of equipment.

OBJECTIVES AND SUMMARY OF THE INVENTION

The applicants have thus developed a new solid/solid separator integrated into a combustion reactor of a CLC plant, suitable for an industrial implementation of the CLC. According to the invention, the geometry of the solid/solid separator is parallelepipedal, just like that of the combustion reactor which it surmounts, and the separator comprises at least one inlet for the gas/solid mixture resulting from the combustion reactor which is also parallelepipedal in shape, the inlet being equipped at its top with means for distribution of said mixture in the chamber which extend over the entire length of said inlet.

The present invention is targeted in particular at providing a solid/solid separator making it possible to efficiently separate the particles of unburnt residues and the particles of the oxygen carrier, while being suitable for an industrial use involving large-sized items of equipment.

In addition, the present invention is targeted at reducing the costs of manufacture of the solid/solid separator and at simplifying its construction, as well as increasing the lifetime of the solid/solid separator.

Thus, in order to achieve at least one of the objectives targeted above, inter alia, the present invention provides, according to a first aspect, a plant for the chemical looping combustion of a solid hydrocarbon feedstock generating particles of unburnt residues and employing particles of an oxygen-carrying solid, said plant comprising:
- a reduction reactor operating as fluidized bed in order to carry out the combustion of said solid hydrocarbon feedstock in contact with the particles of the oxygen-carrying solid, said reactor having a parallelepiped shape;
- an oxidation reactor operating as fluidized bed in order to oxidize the reduced particles of the oxygen-carrying solid originating from the reduction reactor by bringing into contact with an oxidizing gas;
- a solid/solid separator surmounting said reduction reactor in order to separate the particles of the oxygen-carrying solid from the particles of unburnt residues contained in the gas/solid mixture resulting from said reduction reactor, said solid/solid separator comprising a chamber of parallelepipedal shape comprising:
- a lower part operating as dense phase and an upper part operating as dilute phase;
- at least one inlet of parallelepipedal shape for the gas/solid mixture originating from the reduction reactor, said inlet emerging in the upper part of the chamber and being equipped at its top with means for distribution of said gas/solid mixture in the chamber which extend over the entire length of said inlet;
- at least one drain placed in the lower part of the chamber;
- at least one outlet located in the upper part of the chamber.

Preferably, the plant additionally comprises a gas/solid separator fed by the outlet of the chamber of the solid/solid separator, the gas/solid separator comprising a pipe for discharge of a gas depleted in light particles of unburnt residues, and a transportation pipe in communication with the reduction reactor in order to recycle the particles of unburnt residues to the reduction reactor.

Advantageously, the chamber of the solid/solid separator and its inlet have a rectangular parallelepipedal shape.

Preferably, the reduction reactor has a rectangular parallelepipedal shape.

The chamber of the solid/solid separator can comprise two drains positioned at the bottom of the chamber on either side of the inlet.

Preferably, the inlet is centered in the chamber.

According to a first embodiment, the means for distribution of said gas/solid mixture in the chamber of the solid/solid separator comprise a beam of V-shaped section open toward the top of the chamber.

Advantageously, the opening angle $\alpha$ of the V-shaped section of the beam is between 10° and 150°, and preferably between 10° and 90°, and more preferentially still between 10° and 40°.

Advantageously, the top of the beam is at a distance H from the top of the inlet of between $0.5 \times L_2$ and $5 \times L_2$, preferably between $0.5 \times L_2$ and $3 \times L_2$ and more preferentially still between $0.5 \times L_2$ and $1 \times L_2$, $L_2$ being the width of the internal space of the inlet.

Advantageously, the top of the beam has a width $L_1$ of between $0.1 \times L_2$ and $1.5 \times L_2$, preferably between $0.2 \times L_2$ and $1 \times L_2$ and more preferentially still between $0.3 \times L_2$ and $0.7 \times L_2$, $L_2$ being the width of the internal space of the inlet.

According to a second embodiment, the solid/solid separator comprises means for cooling the inlet and the beam.

Preferably, the cooling means are metal tubes for the passage of a heat-exchange fluid, said tubes being fixed to an external face of the walls forming the inlet and to an internal face of the walls forming the beam.

According to a third embodiment, the means for distribution of said gas/solid mixture in the chamber of the solid/solid separator comprise a curved plate with a concavity facing the bottom of the chamber, the curved plate being connected to the two walls forming the inlet and being provided with at least two slots positioned on either side of a central part of said curved plate for the passage of the gas/solid mixture and its distribution toward the periphery of the chamber.

Advantageously, this solid/solid separator additionally comprises means for cooling the inlet and the curved plate, preferably said cooling means being metal tubes for the passage of a heat-exchange fluid, said tubes being fixed to an external face of the walls forming the inlet and to an external face of the curved plate.

According to another embodiment, the means for distribution of said gas/solid mixture in the chamber of the solid/solid separator comprise a cylindrical beam.

Other subject matters and advantages of the invention will become apparent on reading the description which follows of specific exemplary embodiments of the invention, given by way of nonlimiting examples, the description being made with reference to the appended figures described below.

In the figures, the same references denote identical or analogous elements.

DESCRIPTION OF THE INVENTION

The subject matter of the invention relates to a CLC plant for the combustion of solid hydrocarbon feedstocks generating particles of unburnt residues, which can be employed on the industrial scale for large production capacities, and comprising a solid/solid separator in order to efficiently separate the particles of the oxygen-carrying solid from the particles of unburnt residues contained in the gas mixture exiting from the combustion reactor. The solid/solid separator, the combustion reactor and the inlet for the gas mixture into the solid/solid separator have a parallelepiped shape, and the inlet comprises means for dispersion of the gas mixture in the separator extending along from the top of the inlet.

In the present description, the expressions "oxygen-carrying material", "oxidation/reduction active mass" and "oxygen carrier" are equivalent. The oxidation/reduction mass is said to be active in relation to its reactive capacities, in the sense that it is capable of acting as oxygen transporter in the CLC process by capturing and releasing oxygen. The abbreviated expression "oxygen carrier" or "active mass" or the term "oxygen-carrying solid" can also be used.

It should be noted that, in general, the terms oxidation and reduction are used in relation to the respectively oxidized or reduced state of the active mass. The oxidation reactor, also called air reactor, is that in which the oxidation/reduction mass is oxidized and the reduction reactor, also called fuel reactor or combustion reactor, is the reactor in which the oxidation/reduction mass is reduced. The reactors operate as fluidized bed and the active mass circulates between the oxidation reactor and the reduction reactor. The circulating fluidized bed technology is used to make possible the continuous passage of the active mass from its oxidized state in the oxidation reactor to its reduced state in the reduction reactor.

Figure 1:
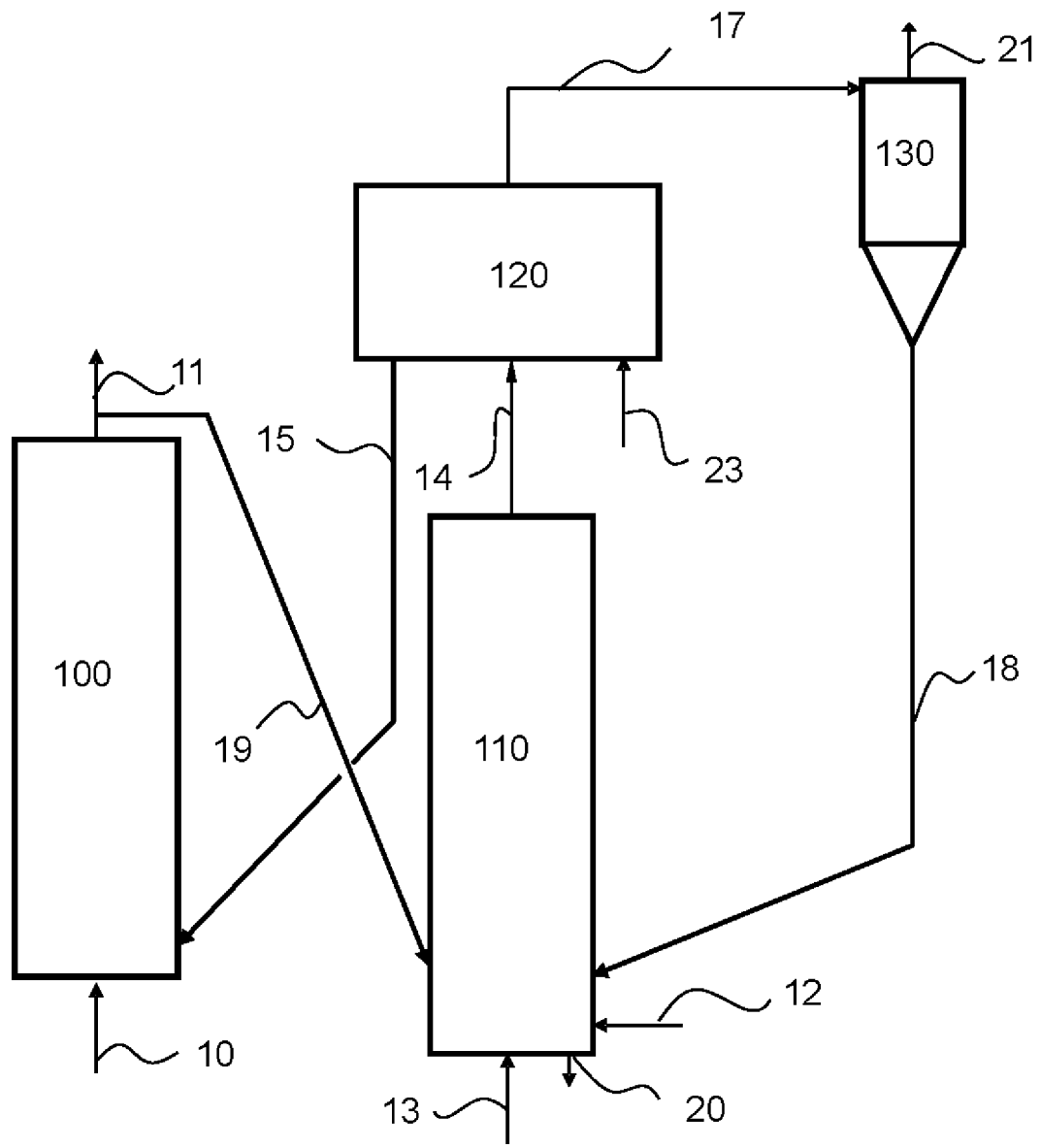
FIG. 1 is a block diagram of a CLC plant according to the invention.

The general operating principle of a CLC plant according to the invention is represented in FIG. 1.

Before describing its operation in more detail, the CLC plant according to the invention comprises the following main elements:

a reduction reactor 110 which operates as fluidized bed in order to carry out the combustion of the solid hydrocarbon feedstock 12 in contact with the particles of the oxygen-carrying solid 19, the reactor 110 having a parallelepiped shape;

an oxidation reactor 100 which operates as fluidized bed in order to oxidize the reduced particles of the oxygen-carrying solid 15 originating from the solid/solid separator 120 surmounting the reduction reactor 110 by bringing into contact with an oxidizing gas 10;

the solid/solid separator 120 surmounting the reduction reactor 110 in order to separate the particles of the oxygen-carrying solid from the particles of unburnt residues contained in the gas/solid mixture resulting from the reduction reactor 110. According to the invention, the solid/solid separator 120, represented in more detail in FIGS. 2 to 5 described below, comprises a chamber of parallelepipedal shape comprising a lower part operating as dense phase and an upper part operating as dilute phase. It comprises at least one inlet of parallelepipedal shape for the gas/solid mixture originating from the reduction reactor 110, this inlet emerging in the upper part of the chamber and being equipped at its top with means for distribution of said gas/solid mixture in the chamber which extend over the entire length of said inlet; The solid/solid separator also comprises at least one drain placed in the lower part of the chamber, in order to discharge the particles of the oxygen carrier, and at least one outlet located in the upper part of the chamber in order to discharge the lighter particles comprising the particles of unburnt residues with the combustion gases. The chamber of the solid/solid separator 120 can also comprise a pipe for feeding with a gas 23 originating from an external source in order to contribute to the fluidization and to the solid/solid separation. The CLC plant can also comprise a gas/solid separator 130, typically of cyclone type, fed by the outlet of the chamber of the solid/solid separator 120, said gas/solid separator 130 comprising a pipe for discharge of a gas 21 depleted in light particles of unburnt residues, and a transportation pipe in communication with the reduction reactor 110 in order to recycle a stream 18 containing the particles of unburnt residues to the reduction reactor 110.

In the CLC plant, the reduced oxygen carrier in the form of particles 15 is brought into contact with the stream of oxidizing gas 10, typically air, in the reaction zone 100 defined above as the air reactor (or oxidation reactor). This results in the stream depleted in oxygen 11 (depleted air stream) and in the stream of reoxidized particles 19. The stream of oxidized oxygen-carrying particles 19 is transferred to the reduction zone 110 defined above as the reduction reactor, also called combustion reactor or fuel reactor. The stream of particles 19 is brought into contact with the fuel 12, which is a solid hydrocarbon feedstock. This results in the gas/solid mixture 14 comprising the products of the combustion, that is to say the gases resulting from the combustion, predominantly $CO_2$ and $H_2O$ if the combustion is complete but also $H_2$ and $CO$ in the event of incomplete combustion, a gaseous remainder which may also originate from the fluidization gas 13 introduced into the reduction reactor (for example recycled $CO_2$ and/or steam), as well as the particles of reduced oxygen carrier, the particles of unburnt residues and ash. A pipe can be positioned in the lower part of the reactor 110 in order to extract the ash agglomerated together 20 formed in the reactor 110. For the sake of simplicity, the representation of FIG. 1 does not comprise the various items of equipment which may form part of the CLC unit or for the exchange of heat. In the same way, FIG. 1 does not exhaustively represent all the possible items of equipment relating to the separation or the possible recirculations of material around the air and fuel reactors. Only the separation of the elements included in the effluent resulting from the combustion reactor 110, and described below, and the recirculation of a part of these elements to the combustion reactor are represented.

In the combustion reactor 110, the solid hydrocarbon feedstock 12 is brought into contact cocurrentwise with the oxidation/reduction active mass in the form of particles 19 in order to carry out the combustion of said feedstock by reduction of the oxidation/reduction active mass.

The oxidation/reduction active mass $M_xO_y$, M representing a metal, is reduced to the $M_xO_{y-2n-m/2}$ state by means of the $C_nH_m$ hydrocarbon feedstock, which is correspondingly oxidized to give $CO_2$ and $H_2O$, according to the reaction (1) below, or optionally to give a $CO+H_2$ mixture, according to the proportions used.

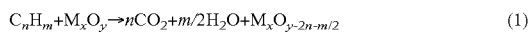

$$C_nH_m + M_xO_y \rightarrow nCO_2 + m/2 H_2O + M_xO_{y-2n-m/2} \quad (1)$$

The combustion of the feedstock 12 in contact with the active mass is carried out at a temperature generally of between 600° C. and 1400° C., preferentially between 800° C. and 1000° C. The contact time varies depending on the type of feedstock used. It typically varies between 1 second and 20 minutes, for example preferably between 1 and 10 minutes for a solid feedstock.

The gas mixture 14 comprising in particular the gases resulting from the combustion and the particles of the active mass and the particles of unburnt residues is discharged at the top of the reduction zone 110 and introduced into a solid/solid separator 120 which makes it possible to separate the heavier particles of the oxygen carrier discharged at the bottom of the solid/solid separator 120, in all or in part by a stream 15, to the oxidation reactor 100, and the lighter particles of unburnt residues discharged with the combustion gases by the stream 17 in the upper part, preferably at the top, of the solid/solid separator 120. Most of the particles of unburnt residues can be separated from the combustion gases in the gas/solid separator 130 and can be sent back to the combustion reactor 110 by a stream 18. The description of the operation of the solid/solid separator 120 is described below.

In the oxidation reactor 100, the active mass is restored to its $M_xO_y$ oxidized state on contact with air 10, according to the reaction (2) below, before returning according to a stream 19 to the reduction reactor 110, and after having been separated from the oxygen-depleted air 11 discharged at the top of the oxidation reactor 100.

$$M_xO_{y-2n-m/2} + (n+m/4)O_2 \rightarrow M_xO_y \quad (2)$$

where n and m respectively represent the number of carbon and hydrogen atoms which have reacted with the active mass in the combustion reactor.

The temperature in the oxidation reactor is generally between 600° C. and 1400° C., preferentially between 800° C. and 1000° C.

The active mass, passing alternately from its oxidized form to its reduced form and vice versa, describes an oxidation/reduction cycle.

The reaction zones making possible the implementation of chemical looping combustion reactions are generally constituted by fluidized beds or circulating fluidized beds, also called transport beds.

In the present invention, the treated hydrocarbon feedstocks are solid hydrocarbon feedstocks, such as coal, coke, pet-coke, biomass, oil sands or household waste.

The oxidation/reduction mass can be composed of metal oxides, such as, for example, oxides of Fe, Ti, Ni, Cu, Mn, Co or V, alone or as a mixture, which can originate from ores (for example ilmenite or pyrolusite) or be synthetic (for example copper oxide particles supported on alumina, $CuO/Al_2O_3$, or nickel oxide particles supported on alumina, $NiO/Al_2O_4$, preferably copper oxide particles supported on alumina, $CuO/Al_2O_3$), with or without binder, and exhibits the required oxidation/reduction properties and the characteristics necessary for carrying out the fluidization. The oxygen storage capacity of the oxidation/reduction active mass is advantageously, depending on the type of material, between 0.5% and 15% by weight. Advantageously, the amount of oxygen effectively transferred by the metal oxide is between 0.5% and 3% by weight, which makes it possible to use only a fraction of the total oxygen transfer capacity, ideally less than 30% of the latter, in order to limit the risks of mechanical aging or of agglomeration of the particles. The use of a fraction only of the oxygen transportation capacity also has the advantage that the fluidized bed acts as a thermal ballast and thus smooths the variations in temperature on the route of the oxygen carrier.

The active mass is in the form of fluidizable particles, belonging to groups A, B or C of the Geldart classification. By way of example, and in a nonlimiting way, the particles of the oxidation/reduction active mass can belong to group B of the Geldart classification and can exhibit a particle size such that more than 90% of the particles have a size of between 100 μm and 500 μm, preferably of between 150 μm and 300 μm. Preferably, the particles of the oxidation/reduction active mass have a density of between 1000 kg/m³ and 5000 kg/m³ and preferentially between 1200 kg/m³ and 4000 kg/m³.

The oxidation/reduction active mass can undergo a phase of activation so as to increase its reactive capacities, which may consist of a phase of rise in temperature, preferably a gradual one, preferably under an oxidizing atmosphere (for example under air).

The combustion reactor 110 can comprise a dense-phase fluidized bed or a transport fluidized bed or even an arrangement of beds constituted by a dense phase and by a transport phase, as is, for example, described in the application WO11151537. In the latter case, the combustion reactor can then comprise a narrowed upper part which makes it possible to accelerate and to transport the gas/particles mixture exiting from the combustion reactor.

Although a single combustion reactor is represented, the CLC plant can comprise two combustion reactors in series, in particular a first reactor operating as dense phase, in which the solid feedstock undergoes essentially a devolatilization of the volatile compounds, which generally represent from 5% to 50% by weight of the solid feedstock depending on its origin, and a gasification on contact with the oxygen carrier particles 19, surmounted by a second reactor ensuring the combustion of the gas mixture resulting from the first reactor operating in a dilute fluidized bed, typically a reactor of elongated shape in which the gases have a higher superficial velocity than in the first reactor, as is described in the application WO11151535. According to such a configuration, the nominal conditions in the first reduction reactor are preferably as follows: a mean residence time of the solid phase (solid fuel and oxygen carrier) of between 0.25 minute and 20 minutes, preferably between 2 minutes and 10 minutes, a superficial velocity of the gas generally of between 0.3 and 3 m/s (at the reaction conditions at the outlet of the first reactor) and a concentration of oxygen carrier at least equal to 10% by volume. The conditions in the second reduction reactor are preferably as follows: a residence time of the gas phase generally of between 1 second and 20 seconds, the stream of transported solid of between 25 and 500 kg/s/m$^2$, preferentially of between 60 and 300 kg/s/m$^2$, a superficial velocity of the gas of greater than 3 m/s and less than 30 m/s, preferably of between 5 and 15 m/s (expressed at the conditions), so as to facilitate the transportation of all of the particles while minimizing the pressure drops so as to optimize the energy efficiency of the process. In this second reduction reactor, the flow is diluted and most of the volume is occupied by the gas. Thus, the void fraction (percentage of the volume occupied by the gas) is generally greater than 90%, indeed even 95%.

In the CLC plant according to the invention, the combustion reactor 110 surmounted by the solid/solid separator 120 has a parallelepiped shape, preferably a rectangular shape. Such a reactor geometry is well suited to an industrial implementation of the CLC comprising large-sized items of equipment. The term "large-sized" is understood to mean reactors, the section of which is expressed in tens of m$^2$, over heights of several tens of meters. It makes it possible, for example, to facilitate the increase in scale of the CLC plant by a possible duplication of the reactor in one dimension in order to increase the capacity thereof. In addition, this particular geometry also has the advantage of simplifying the possible installation of refractory materials over the entire internal surface in order to protect the metal chamber of the reactor from high temperatures. For example, layers of reinforced refractory cement, typically having thicknesses generally of between 2 and 50 cm, generally in the vicinity of 20 cm, on the internal faces exposed to the flow and to high temperatures make it possible to use standard steels for the external parts of the reactor. The refractory material used to form layers on the internal faces of the metal wall of the reactor can also be bricks. Another configuration consists of walls comprising tubes in which a heat-exchange fluid circulates, like, for example, steam, such as the system described in FIG. 4 for the solid/solid separator 120.

The solid/solid separator 120 of the plant according to the invention is described in more detail below, in connection with FIGS. 2 to 5. Its operating principle is as follows:

The gas/solid mixture 14 is introduced by an inlet emerging in the chamber of the separator 120 in the form of a dilute phase composed essentially of gas (at least 90% by volume).

The solid particles transported with the gas in the gas/solid mixture 14 are essentially:
the particles of oxygen carrier which have given up at least a part of their oxygen during their passage through the combustion reactor 110;
the unburnt particles of solid fuel, or particles of unburnt residues;
possibly fly ash, which are noncombustible elements resulting from the total combustion of the particles of solid fuel for which the residence time in the combustion reactor has been sufficient.

Due to the imposed velocity of the gas in the solid/solid separator 120, the heavy particles sediment in the lower part of the solid/solid separator 120 and are extracted (stream 15) by at least one drain provided in the lower part of the chamber, while the light particles are entrained into the upper part of the solid/solid separator 120 and are discharged (stream 17) by an outlet located in the upper part of the chamber, for example at the top of the chamber. The heavy particles are essentially constituted by the particles of the oxygen carrier to be recycled and the light particles are essentially constituted by the particles of unburnt residues to be recycled to the combustion zone and possibly by fly ash. Within the solid/solid separator 120, the superficial velocity of the gas flow is greater than the terminal rate of fall of the unburnt particles of fuel in order to make possible their entrainment with the gas, for example 3 times greater than the terminal rate of fall of the unburnt particles of fuel. Thus, by subjecting the mixture of particles which results from the combustion reactor 110 to a gas flow of imposed velocity, it is possible to carry out a "rapid" separation between the heavy particles and the light particles. The term "rapid separation" means a separation taking place in less than 1 minute and preferentially in less than 20 seconds, this duration corresponding to the residence time of the light particles in the dilute phase of the separator 120. The dilute phase generally exhibits a solids content generally less than 5%, indeed even of less than 1% (vol.).

The separator 120 comprises a chamber of parallelepipedal, preferably rectangular, shape with at least one inlet for said mixture of also parallelepipedal, preferably rectangular, shape, at least one drain located in the lower part of the chamber and at least one outlet located in the upper part of the chamber, the inlet and drain/outlet parameters being chosen in order to create, in the chamber, a dense phase in the lower part and a dilute phase in the upper part, and in which the inlet emerges in the dilute phase.

Thus, the separation is carried out in the dilute phase of the solid/solid separator 120 so as to obtain the best possible separation efficiency.

The separation efficiency can be defined by the formula:

$X$=amount of particles of unburnt residues entrained with the gas/total amount of particles of unburnt residues in the mixture of particles entering the separator.

A separation efficiency generally of greater than 70%, indeed even of greater than 80%, can be obtained with the use of such a solid/solid separator 120.

Due to this good separation efficiency, it is possible to optimize the $CO_2$ capture rate of the process, this being defined by the ratio of amount of $CO_2$ emitted in the combustion zone/total amount of $CO_2$ emitted in the CLC loop. Thus, the capture rate can be greater than 90%. Such a separation efficiency, influencing the recycling of unburnt residues in the combustion reactor, can make it possible to limit the residence time of the feedstock in the combustion reactor, which can allow different designs of the combustion reactor, in particular a zone as a more compact dense-phase fluidized bed.

Preferably, the gas flow at imposed velocity is induced entirely by the gas/solid mixture 14 originating from the combustion reactor 110 but it is also possible to adjust the velocity by supplementary injection of a gas 23 originating from a external source, which can also contribute to the fluidization of a dense phase accumulating the sedimented particles.

Preferably, the superficial velocity of the gas in the dilute phase of the chamber of the separator 120 is set at a value generally of between 30% and 300% of the mean terminal rate of fall of the oxygen carrier particles, preferably of between 50% and 150% and more preferably of between 75% and 125%.

The mean terminal rate of fall is obtained from the formula (*):

$$Vt = \left(\frac{4d_p(\rho_s - \rho_g)g}{3\rho_g C_D}\right)^{1/2}$$

where:
$d_p$ is the mean diameter of the particles
$\rho_s$ is the density of the particles (kg/m³)
$\rho_g$ is the density of the gas (kg/m³)
$C_D$ is the drag coefficient
(*): extracted from Fluidization Engineering, Butterworth-Heinemann, Daizo Kunii, Octave Levenspiel, p. 80).

The gas stream 17 thus comprises the combustion gases and the lightest particles which are predominantly particles of unburnt residues and possibly fly ash, it being possible for a minority fraction of these lightest particles to be constituted by particles of oxygen carriers, in particular fines of the oxygen carrier produced by attrition. This stream can be sent to a gas/solid separator 130, for example a cyclone, in order to recover the solid particles contained in the gas stream 17 and to recycle them to the combustion reactor 110 by a stream 18, after optional removal of the fly ash by fluidized bed elutriation, for example. In this case, the outlet of the chamber of the solid/solid separator 120 feeds the gas/solid separator 130 which comprises a pipe for discharging the gas 21 depleted in light particles of unburnt residues and a transportation pipe in communication with the reduction reactor 110 in order to recycle the particles of unburnt residues to the reduction reactor 110. Although just one gas/solid separation stage is represented in FIG. 1, other gas/solid separators, of the type of cyclones or filters, for example, can be provided downstream of the gas/solid separator 130 in order to carry out a more thorough removal of dust from the combustion effluents.

Figure 2:
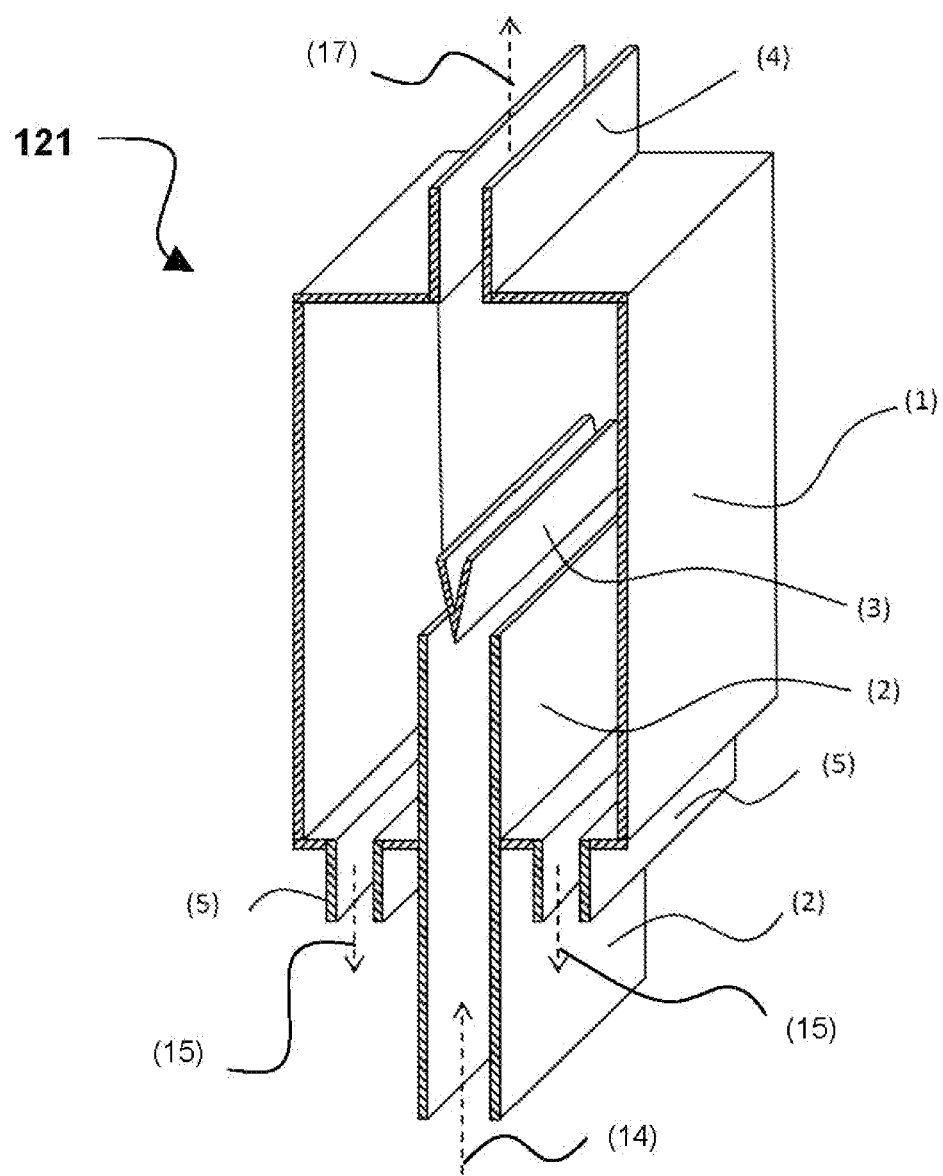
FIG. 2 is a schematic perspective view of a solid/solid separator of the CLC plant according to a first embodiment.

FIG. 2 is a diagram of a solid/solid separator according to a first embodiment.

The solid/solid separator 121 comprises a chamber 1 in rectangular parallelepipedal shape comprising an inlet 2 for the gas/solid mixture 14 composed of solid particles of the oxygen carrier, of solid particles of unburnt residues, of ash and of gas, essentially of steam, of $CO_2$ and of synthesis gas (CO and $H_2$) in small amounts, said mixture 14 originating from the combustion reactor 110 located below the solid/solid separator 121.

The inlet 2 has a parallelepiped, preferably rectangular, shape. It is more precisely composed of two facing walls, preferably substantially parallel, extending preferably over substantially the entire length of the chamber 1. The chamber 1 can also comprise several inlets 2 for such a gas/solid mixture. The inlet(s) 2 are connected in their lower part to the top of the combustion reactor.

The inlet is preferably centered in the chamber 1. It can also be off-center without, however, this off-centering being too great, in order to retain an as uniform as possible distribution of the gas/solid mixture in the chamber 1 at the outlet of the inlet 2.

The height between the top of the inlet and the top of the chamber is, for example, between 0.5 and 2 times the height of disengagement, preferentially between 1 and 1.2 times the height of disengagement, the height of disengagement being the height from which the concentration of solid entrained in the gas phase is constant.

The inlet enters the chamber over an axial depth preferably of between $0.7 \times L_2$ and $5 \times L_2$, more preferentially between $1.5 \times L_2$ and $3 \times L_2$, $L_2$ being the width of the inlet, that is to say the width of the internal space of the inlet 2, which is the internal space formed between the two constituent walls of the inlet 2 facing each other.

The chamber 1 of the solid/solid separator 120 also comprises in its upper part an outlet 4 for another gas/solid mixture 17 essentially composed of the abovementioned gas, of the major part of the solid particles of unburnt residues, of the ash and of a small part of the particles of the oxygen carrier. The outlet 4 is preferably positioned at the top of the chamber. The outlet 4 can also be positioned on a side wall in the upper part of the chamber, making it possible to discharge the gas/solid mixture 17 laterally and to facilitate, for example, the connection to the solid/solid separator 130. The mixture 17 exiting by the outlet 4 is preferably directed to a gas/solid separator 130, for example a cyclone, as already explained above. The chamber 1 can also comprise several outlets for such a gas/solid mixture 17.

The outlet 4 preferably has a parallelepiped, preferably rectangular, shape, as represented. In this case, it extends preferably over substantially the entire length of the chamber. The outlet 4 can, however, have any other geometric shape, for example cylindrical, in order to facilitate the connection to the solid/solid separator 130.

The outlet 4 is preferably centered in the chamber 1. Alternatively, it can be off-center.

The chamber 1 of the solid/solid separator 120 comprises two drains 5 positioned at the bottom of the chamber 1 on either side of the inlet 2. They make it possible for a mixture of solids 15 composed predominantly of particles of the oxygen carrier and of a small fraction of solid particles of unburnt solid residues, preferably a content of solid particles of unburnt solid residues of less than 30%, preferentially of less than 20%, of the initial content in the gas/solid mixture arriving by the inlet 2 to be drained and directed to the oxidation reactor 100, where the particles of the oxygen carrier are again oxidized on contact with an oxidizing gas, e.g. air. A single drain or more than two drains can be alternatively provided in the chamber 1 in order to drain the mixture of solids 15.

The drains 5 preferably have a parallelepiped, preferably rectangular, shape. They extend preferably over substantially the entire length of the chamber. Alternatively, they can have another geometric shape, for example a cylindrical shape.

In a configuration where the inlet 2, the outlet 4 and the drains 5 have a rectangular parallelepipedal shape, as represented in FIG. 2, the inlet 2, the outlet 4 and the drains 5 each comprise two side walls extending over substantially the entire length of the chamber 1, and are preferably substantially parallel to each other.

The objective of the solid/solid separator is first to minimize the concentration of solid particles of unburnt residues in the mixture of solids exiting by the drain 5 at the bottom of the separator 120, in order to limit the entrainment of the unburnt residues to the oxidation reactor and thus to ensure a high capture rate for the $CO_2$, then to minimize the concentration of particles of oxygen carrier in the gas/solid mixture 17 sent to the outlet 4 located in the upper part of the solid/solid separator 120. The efficiency of the solid/solid separator is thus based on an efficient separation of these two populations of solid particles in the chamber 1, the operation of which has already been described above.

According to the invention, the inlet 2 is equipped at its top with means 3 for distribution of said gas/solid mixture in the chamber 1 which extend over the entire length of the inlet 2. These means are positioned at the top of the inlet 2 in order to improve the distribution of the gas/solid mixture 14 over the entire section of the chamber 1 of the solid/solid separator 120. This better distribution of the gas/solid mixture at its entry into the chamber improves the gravity separation of the solid particles. By an effect of deviation of the gas/liquid mixture linked to the presence of the distribution means 3, the densest particles, i.e. those of the oxygen carrier, are slowed down on approaching the side walls of the chamber 1 and fall back toward the bottom of the chamber 1. The lightest particles, comprising the particles of unburnt residues, retain a sufficient entrainment velocity to reach the top of the chamber 1 and to exit with the gases by the outlet 4.

The distribution means 3 themselves also cause a slowing down of the particles by contact of the particles with said means, playing, as it were, a "anti-splash" role, which in the same way improves the gravity separation of the particles of the oxygen carrier and of the unburnt residues in the chamber 1 of the separator.

According to the first embodiment as represented in FIG. 2, these means for distribution of the gas/solid mixture 14 are formed by a beam 3 of V-shaped section open toward the top of the chamber 1.

The beam can be fixed to the inlet, or to another support, such as the walls of the chamber, by any fixing means known to a person skilled in the art which is resistant to the operating conditions of the CLC, for example by mounting lugs or any other fixed connecting element welded between the walls of the inlet or of the chamber and the beam. The elements for fixing the beam are not represented in FIG. 2 for the sake of simplicity.

Figure 3:
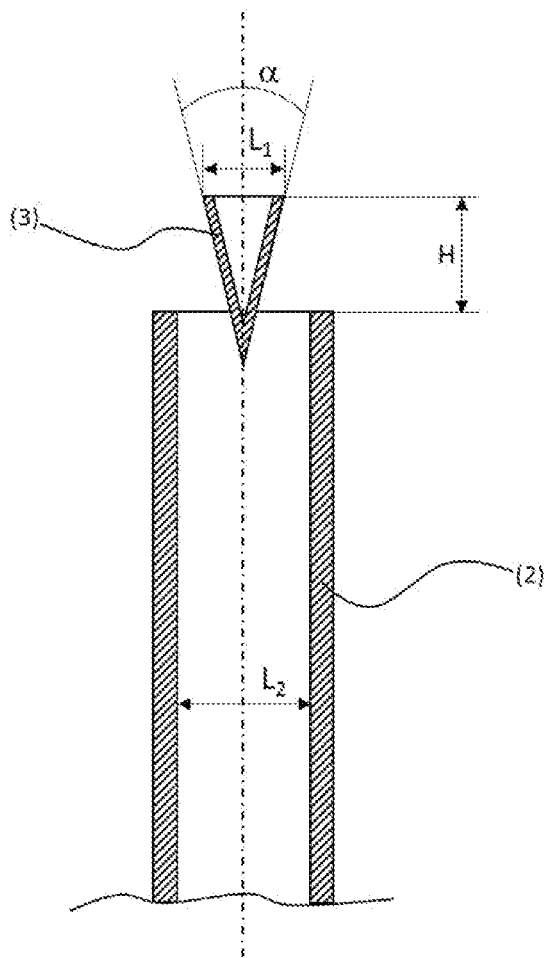
FIG. 3 is a schematic sectional view of a part of the solid/solid separator according to the first embodiment illustrated in FIG. 2.

FIG. 3 represents a detailed view of a part of the solid/solid separator 120 showing the arrangement of the beam 3 with respect to the inlet 2.

The geometry and the position of the beam 3 are defined in particular by the following parameters:
the opening angle α of the V-shaped section of the beam, formed between the two walls forming the beam of V-shaped section,
the width $L_1$ of the beam 3, defined at the top of the beam where it is the greatest as a result of the V-shaped section open toward the top of the chamber 1,
the distance H between the top of the beam and the top of the inlet 2, more precisely between the horizontal plane at the top of the beam 3 and the horizontal plane at the top of the inlet 2.

These last two parameters, $L_1$ and H, can be expressed as a function of the width $L_2$ of the inlet 2. The width $L_2$ of the inlet is the width of the internal space of the inlet 2, that is to say the internal space formed between the two facing walls of the inlet 2.

Advantageously, the V-shaped section of the beam 3 preferably forms an opening angle α of between 10° and 150°, more preferentially between 10° and 90° and more preferentially still between 10° and 50°. For example, the opening angle is 30°. A geometry with a low opening angle α, preferably of between 10° and 50°, is preferred because it makes it possible to provide a contact surface of the walls of the beam with the entrained particles which is as tangential as possible, which makes it possible in particular to limit the intensity of the mechanical impacts exerted on the particles of the oxygen carrier and consequently their wear by attrition.

Advantageously, the distance H is between $0.5 \times L_2$ and $5 \times L_2$, preferably between $0.5 \times L_2$ and $3 \times L_2$ and more preferentially still between $0.5 \times L_2$ and $1 \times L_2$. For example, the distance H is $0.9 \times L_2$.

Advantageously, the width $L_1$ is between $0.1 \times L_2$ and $1.5 \times L_2$, preferably between $0.2 \times L_2$ and $1 \times L_2$ and more preferentially still between $0.3 \times L_2$ and $0.7 \times L_2$. For example, the width $L_1$ is $0.5 \times L_2$.

According to an alternative form, the beam 3 can be solid and thus exhibit a section in the shape of a triangle.

The beam 3 can be formed of a single piece, or by the assembling of several pieces, for example a succession of longitudinal plates fixed to one another in order to form the beam with a V-shaped section.

Figure 4:
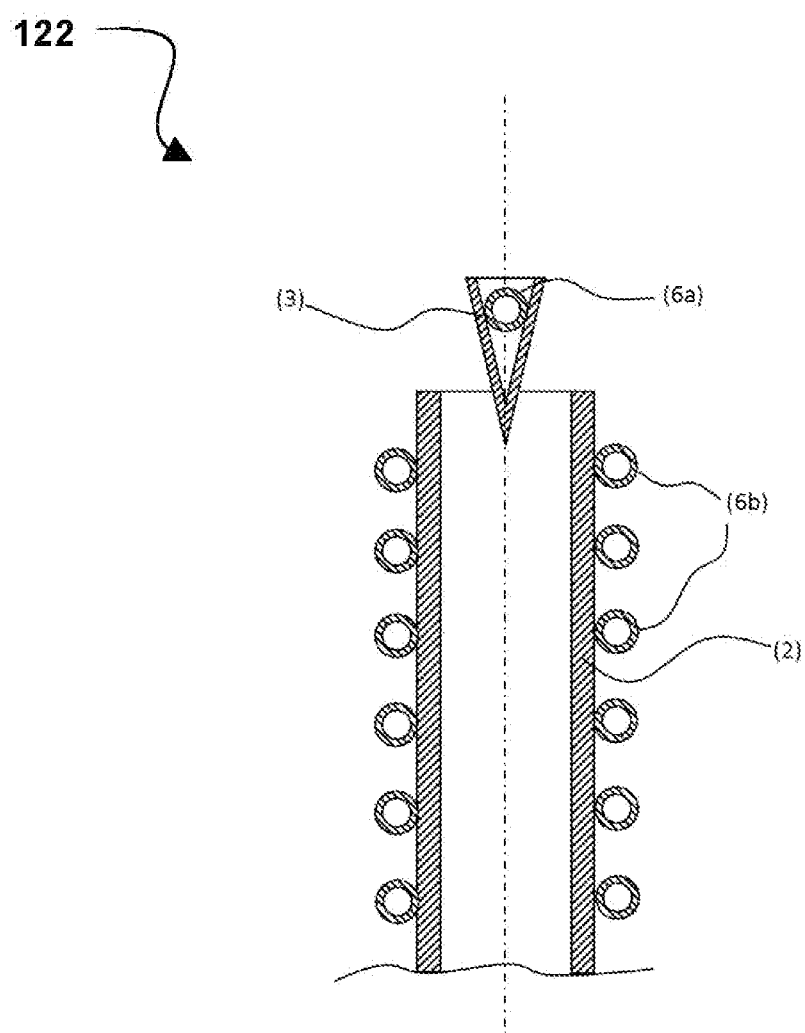
FIG. 4 is a schematic sectional view of a part of the solid/solid separator according to a second embodiment.

The materials used to construct the chamber of the solid/solid separator and its constituent elements (inlet(s), drain(s), outlet(s), distribution means, and the like) can be chosen from refractory materials, for example of refractory concrete, refractory brick or ceramic type, high temperature steels, for example of Hastelloy®, Incoloy®, Inconel® or Manaurite® type, or conventional steels, for example of cooled stainless steel or cooled carbon steel type depending on the alternative form presented in FIG. 4 and described below, or a combination of these materials.

FIG. 4 represents a detailed view of a part of a solid/solid separator 122 according to a second embodiment of the invention. The view is centered on the beam 3 and the inlet 2. The solid/solid separator 122 is identical in all respects to that according to the first embodiment, except for the fact that it additionally comprises means for cooling the inlet 2 and the beam 3.

The geometry of the solid/solid separator 122, in particular the inlet 2 of parallelepipedal shape, preferably extending over substantially the entire length of the parallelepipedal chamber, as well as the V-shaped beam surmounting said inlet 2, make possible the integration of means for cooling the materials forming these elements of the separator.

Preferably, the cooling means comprise metal tubes 6a and 6b for the passage of a heat-exchange fluid, the tubes being fixed, for example welded, to an external face of the walls forming the inlet 2 and to an internal face of the walls forming the beam 3.

The term "external face of the walls of the inlet 2" is understood to mean the face in contact with the internal space of the chamber 1. The term "internal face of the walls of the beam 3" is understood to mean the face in contact with the internal space formed between the two V-shaped walls forming the beam 3.

The beam 3 comprises, for example, at least one tube 6a positioned between the walls which form the V-shaped beam. This configuration makes it possible not to impede the passage of the gas/solid mixture at the outlet of the inlet 2.

The inlet 2 comprises at least one row of tubes 6b, for example 6 rows of tubes 6b, on the external face of each of the two walls which form the inlet. The tubes 6b can, for example, be connected together to form a coil on each wall, or be independent.

Alternatively, the tubes 6a and 6b can be assembled together to form cooling walls and at the same time be structural elements forming the beam 3 and/or the inlet 2.

The tubes are fed with a heat-exchange fluid at a lower temperature than that operated in the solid/solid separator, making possible cooling of the internals by heat exchange, so as to keep them at a temperature in particular below the creep temperatures.

Advantageously, steam is used as heat-exchange fluid.

Such cooling means make possible, on the one hand, the use of more conventional materials for the manufacture of these internal elements of the solid/solid separator, such as steel, instead of refractory alloys, which are expensive and complex to employ, which may be required to withstand the very high operating temperatures of the solid/solid separator, generally greater than 900° C. and potentially greater than 1000° C., which place high demands on the materials and can lead to problems of creep of conventional metal materials.

On the other hand, such cooling means make it possible to make the operation of the solid/solid separator more reliable over the long term, and thus of the CLC installation, with expected mechanical stresses, linked to the high temperatures imposed by the CLC, which are less significant.

Such an embodiment is thus particularly well suited to an industrial implementation involving large-sized items of equipment which are generally expensive, by saving on the manufacturing costs for the solid/solid separator and by saving on the operational costs linked to a more reliable operability over the long term.

In the case where steam is used as heat-exchange fluid, another advantage of this second embodiment lies in the possibility of producing energy by making use of the superheated steam produced by the heat exchange carried out by virtue of these cooling means.

Figure 5:
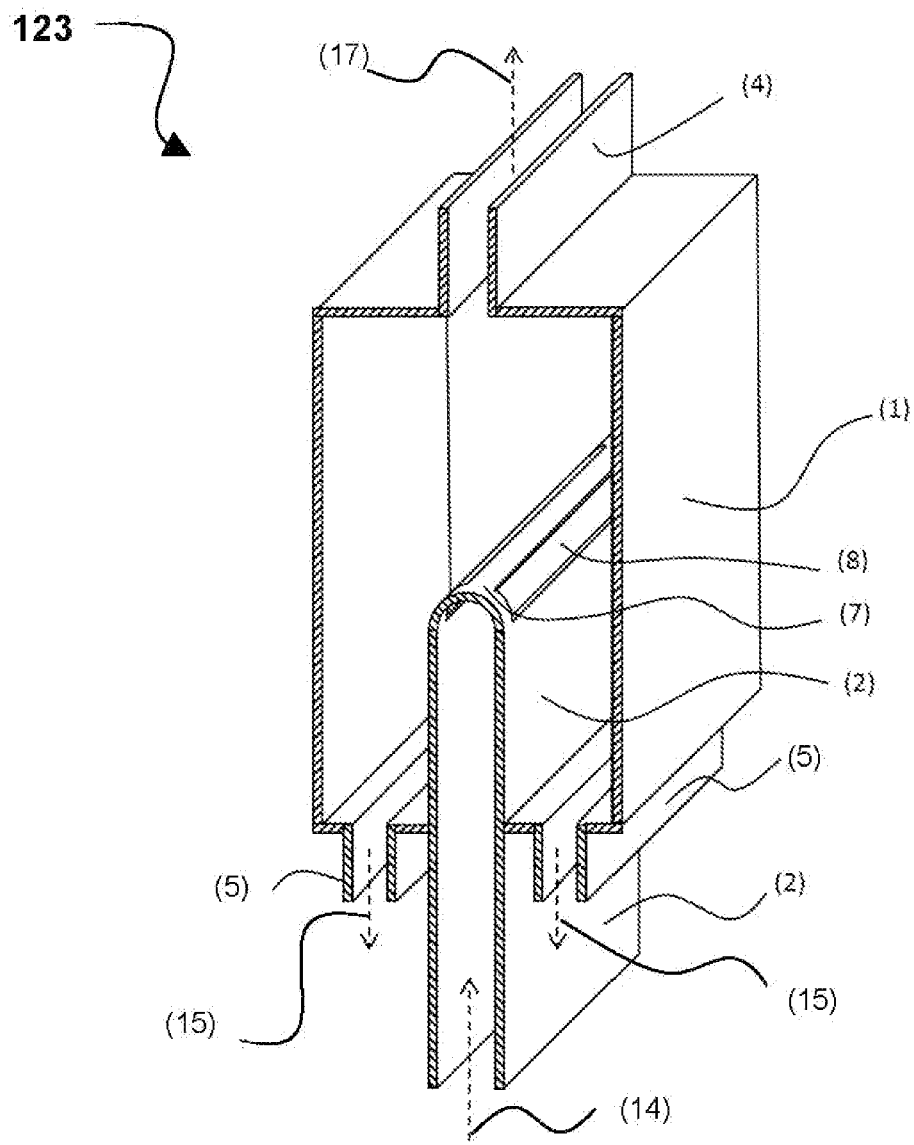
FIG. 5 is a schematic perspective view of a solid/solid separator of the CLC plant according to a third embodiment.

FIG. 5 is a diagram of a solid/solid separator according to a third embodiment. The solid/solid separator 123 is identical to that of the first embodiment, with the exception of the means for distribution of the gas/solid mixture in the chamber.

According to this third embodiment, the means for distribution of the gas/solid mixture
comprise a curved plate 7 with a concavity facing the bottom of the chamber 1, the curved plate 7 being connected to the two walls forming the inlet 2 and being provided with at least two slots 8 positioned on either side of a central part of said curved plate 7 and extending along the top of the inlet 2 for the passage of the gas/solid mixture and its distribution toward the periphery of the chamber 1. The slots 8 preferably extend over substantially the entire length of the top of the inlet. The gas/solid mixture 14 entering the chamber 1 is thus distributed in a way similar to that which was described for the first embodiment with the beam 3.

According to a fourth embodiment, not represented, the solid/solid separator 123 additionally comprises means for cooling the inlet 2 and the curved plate 7. This is an alternative form of the third embodiment.

As for the separator 122 according to the second embodiment represented in FIG. 4, these cooling means are preferably metal tubes for the passage of a heat-exchange fluid, preferably steam. The tubes are fixed to an external face of the walls forming the inlet 2 and to an external face of the curved plate 7. The external face of the curved plate is the face in contact with the internal space of the chamber 1. In contrast, the internal face of the curved plate 7 is positioned on the side of the internal space formed in the inlet 2. The tubes fixed to the inlet 2 can be positioned in a way similar to the configuration described in connection with FIG. 3.

This configuration exhibits similar advantages to those described for the second embodiment of the invention.

According to another embodiment not represented, the solid/solid separator 120 is in all respects identical to that of the first embodiment described in connection with FIG. 2, except for the means for distribution of the gas/solid mixture in the chamber, which are not a beam of V-shaped section open toward the top of the chamber 1 but are formed by a cylindrical beam.

According to this embodiment, the geometry and the position of the beam are defined essentially by the following two parameters: the external diameter $D_1$ of the beam and the distance H between the top of the beam and the top of the inlet of the solid/solid separator, more precisely between the horizontal plane at the top of the beam and the horizontal plane at the top of the inlet. These latter parameters, $D_1$ and H, can be expressed as a function of the width $L_2$ of the inlet, in an identical manner to the parameters $L_1$ and H according to the first embodiment.

Advantageously, the distance H is between $0.5 \times L_2$ and $5 \times L_2$, preferably between $0.5 \times L_2$ and $3 \times L_2$ and more preferentially still between $0.5 \times L_2$ and $1 \times L_2$. For example, the distance H is $0.9 \times L_2$.

Advantageously, the diameter $D_1$ is between $0.1 \times L_2$ and $1.5 \times L_2$, preferably between $0.2 \times L_2$ and $1 \times L_2$ and more preferentially still between $0.3 \times L_2$ and $0.7 \times L_2$. For example, the diameter $D_1$ is $0.5 \times L_2$.

Such a solid/solid separator can also comprise cooling means similar to those described in connection with FIG. 4, in particular metal tubes for the passage of a heat-exchange fluid fixed, for example welded, to an external face of the walls forming the inlet, or welded together to directly form the walls of the inlet, and metal tubes for the passage of a heat-exchange fluid which can be fixed to the inside of the cylindrical beam or be replaced by the cylindrical beam itself in which a heat-exchange fluid can circulate.

EXAMPLE

The example which follows is targeted at showing the efficiency of the means for dispersion of the gas/solid mixture in the solid/solid separator of the CLC plant according to the invention, in comparison with a solid/solid separator devoid of such means.

According to this example, different configurations according to the invention are tested, all employing a beam of V-shaped section open toward the top of the chamber of the solid/solid separator, in accordance with the first embodiment.

The results also show the influence of the opening angle of the V-shaped beam, as well as the position of the V-shaped beam above the top of the inlet.

Different geometries of V-shaped beams are evaluated at different heights with respect to the top of the inlet 2, within a "cold" mockup, that is to say a nonreactive plant operating at ambient temperature, equivalent in size to a solid/solid separator with a power of 1 MWth, with a section of 0.3 m², with a total height of 4 meters and with an inlet height of 1 meter.

A total of six configurations C1 to C6 are tested and compared with a configuration C7 of a solid/solid separator according to the prior art without a beam.

Figure 6:
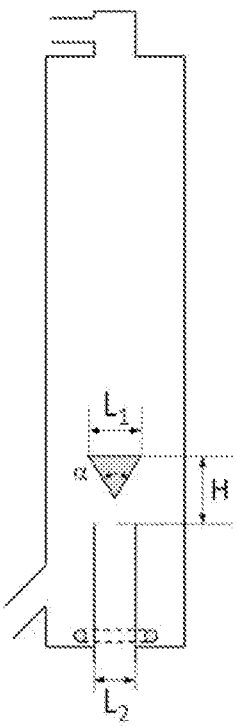
FIG. 6 is a schematic sectional view of a part of an example of the separator according to the first embodiment.

The assembly constructed and the main geometric parameters taken into account, the values of which are summarized in the table below, are represented diagramatically in FIG. 6.

|  | C1 | C2 | C3 | C4 | C5 | C6 |
| --- | --- | --- | --- | --- | --- | --- |
| Angle α (°) | 30 | 30 | 30 | 30 | 60 | 120 |
| H (mm) | 1200 (5 × $L_2$) | 720 (3 × $L_2$) | 216 (0.9 × $L_2$) | 216 (0.9 × $L_2$) | 216 (0.9 × $L_2$) | 216 (0.9 × $L_2$) |
| $L_1$ (mm) | 170 | 170 | 170 | 240 | 240 | 240 |

The distance $L_2$ is set at 240 mm.

These configurations C1 to C7 are evaluated for different flow rates of solid in the form of particles varying from 3000 to 9000 kg/h. The solid is composed of ilmenite, which is an ore combining titanium and iron, the bulk of the population of which has a diameter of between 100 and 150 μm (Sauter diameter dsv=113 μm) for a grain density of 4750 kg/m$^3$.

Figure 7:
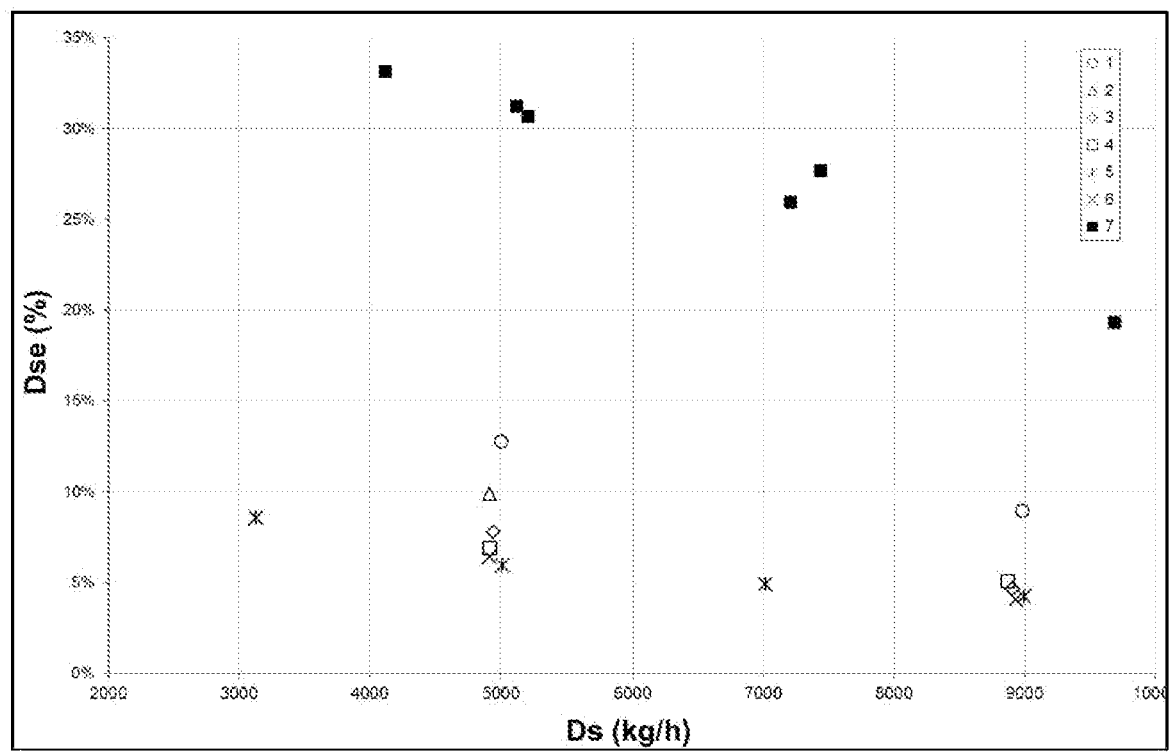
FIG. 7 is a graph representing the flow rate of solid particles (Fs on the abscissa) as a function of the flow rate of entrained solid particles (Fes on the ordinate) for an example of a solid/solid separator according to the prior art and various examples of solid/solid separators according to the invention.

The results are illustrated in the graph in FIG. 7, which gives the flow rate of solid particles (Fs on the abscissa, in kg/h) as a function of the flow rate of entrained solid particles (Fes on the ordinate, in %) for an example of solid/solid separator according to the prior art C7, referenced 7 in the key of the graph, and various examples of solid/solid separators according to the invention C1 to C6, referenced 1 to 6 in the key of the graph.

The efficiency of the solid/solid separation is evaluated on the basis of the percentage of solid particles entrained toward the outlet 4 of the solid/solid separator (ratio of the amount of particles entrained with the gas/total amount of particles in the mixture of particles entering the separator).

The greatest efficiency corresponds to the lowest percentage.

As shown in FIG. 7, it can be seen that the presence of a V-shaped beam at the top of the inlet 2 makes it possible to significantly improve the efficiency, by a factor of 3 to 6 depending on the geometries under consideration.

It is also found that an equivalent efficiency is achieved for the majority of the configurations tested. Only the geometries with a V-shaped beam having an opening angle α of 30° and a small width $L_1$ (170 mm) exhibit a sensitivity as a function of the elevation H of the beam. On the other hand, equivalent performance qualities are achieved when the beam is located as close as possible to the top of the inlet 2 for the gas/solid mixture $$(H=0.9\times L_2).$$

The invention claimed is:

1. A plant for chemical looping combustion of a solid hydrocarbon feedstock generating particles of unburnt residues and employing particles of an oxygen-carrying solid, the plant comprising:
a reduction reactor operating as fluidized bed in order to carry out the combustion of the solid hydrocarbon feedstock in contact with the particles of the oxygen-carrying solid, the reactor having a parallelepiped shape;
an oxidation reactor operating as fluidized bed in order to oxidize the reduced particles of the oxygen-carrying solid originating from the reduction reactor by bringing into contact with an oxidizing gas; and
a solid/solid separator surmounting the reduction reactor in order to separate the particles of the oxygen-carrying solid from particles of unburnt residues contained in a gas/solid mixture resulting from the reduction reactor, the solid/solid separator comprising:
a chamber of parallelepipedal shape comprising
a lower part operating as dense phase and an upper part operating as dilute phase;
at least one inlet of parallelepipedal shape for the gas/solid mixture originating from the reduction reactor, the at least one inlet emerging in the upper part of the chamber and being equipped at a top of the at least one inlet with means for distribution of the gas/solid mixture in the chamber which extend over the entire length of the at least one inlet;
at least one drain placed in the lower part of the chamber;
at least one outlet located in the upper part of the chamber.

2. The plant as claimed in claim 1, additionally comprising a gas/solid separator fed by the at least one outlet of the chamber of the solid/solid separator, the gas/solid separator comprising a pipe for discharge of a gas depleted in light particles of unburnt residues, and a transportation pipe in communication with the reduction reactor in order to recycle a stream containing the particles of unburnt residues to the reduction reactor.

3. The plant as claimed in claim 1, in which the chamber of the solid/solid separator and the at least one inlet have a rectangular parallelepipedal shape.

4. The plant as claimed in claim 1, in which the reduction reactor has a rectangular parallelepipedal shape.

5. The plant as claimed in claim 1, in which the at least one drain comprises two drains positioned at a bottom of the chamber on either side of the at least one inlet.

6. The plant as claimed in claim 1, in which the at least one inlet is centered in the chamber.

7. The plant as claimed in claim 1, in which the means for distribution of the gas/solid mixture in the chamber of the solid/solid separator comprise a beam of V-shaped section open toward the top of the chamber.

8. The plant as claimed in claim 7, in which an opening angle α of the V-shaped section of the beam is between 10° and 150°.

9. The plant as claimed in claim 7, in which the top of the beam is at a distance H from the top of the at least one inlet of between 0.5×$L_2$ and 5×$L_2$, $L_2$ being a width of the internal space of the at least one inlet.

10. The plant as claimed in claim 7, in which the top of the beam has a width $L_1$ of between 0.1×$L_2$, $L_2$ being a width of the internal space of the at least one inlet.

11. The plant as claimed in claim 7, in which the solid/solid separator additionally comprises means for cooling the at least one inlet and the beam.

12. The plant as claimed in claim 11, in which the means for cooling are metal tubes for the passage of a heat-exchange fluid, the tubes being fixed to an external surface of the walls forming the at least one inlet and to an internal surface of the walls forming the beam.

13. The plant as claimed in claim 1, in which the means for distribution of the gas/solid mixture in the chamber of the solid/solid separator comprise a curved plate with a concavity facing a bottom of the chamber, the curved plate being connected to two walls forming the at least one inlet and being provided with at least two slots positioned on either side of a central part of the curved plate for the passage of the gas/solid mixture and distribution of the gas/solid mixture toward a periphery of the chamber.

14. The plant as claimed in claim 13, in which the solid/solid separator additionally comprises means for cooling the at least one inlet and the curved plate.

15. The plant as claimed in claim 1, in which the means for distribution of the gas/solid mixture in the chamber of the solid/solid separator comprise a cylindrical beam.

16. The plant as claimed in claim 7, in which an opening angle $\alpha$ of the V-shaped section of the beam is between 10° and 90°.

17. The plant as claimed in claim 7, in which an opening angle $\alpha$ of the V-shaped section of the beam is between 10° and 40°.

18. The plant as claimed in claim 7, in which the top of the beam is at a distance H from the top of the at least one inlet of between $0.5 \times L_2$ and $3 \times L_2$, $L_2$ being a width of the internal space of the at least one inlet.

19. The plant as claimed in claim 7, in which the top of the beam is at a distance H from the top of the at least one inlet of between $0.5 \times L_2$ and $1 \times L_2$, $L_2$ being a width of the internal space of the at least one inlet.

20. The plant as claimed in claim 7, in which the top of the beam has a width L1 of between 0.2×L2 and 1×L2, L2 being a width of the internal space of the at least one inlet.

* * * * *